(12) United States Patent
Carlson et al.

(10) Patent No.: US 6,374,698 B1
(45) Date of Patent: Apr. 23, 2002

(54) VIBRATION DAMPING DEVICE

(75) Inventors: Cora Carlson, Dittelbrunn; Bernd Peinemann; Jürgen Weth, both of Niederwerrn; Andreas Orlamünder, Schweinfurt, all of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/521,530

(22) Filed: Mar. 7, 2000

(30) Foreign Application Priority Data

Mar. 16, 1999 (DE) .......................... 199 11 564

(51) Int. Cl.$^7$ .............................. F16F 15/10; G05G 3/00
(52) U.S. Cl. ......................... 74/574; 74/572; 192/207; 464/81; 464/84
(58) Field of Search ................ 74/572–574; 464/3, 464/81, 84; 192/30 R, 207; 475/347, 159

(56) References Cited

U.S. PATENT DOCUMENTS

| | | | |
|---|---|---|---|
| 2,666,341 A | | 1/1954 | Riopelle ..................... 74/574 |
| 5,735,768 A | * | 4/1998 | Sudau ........................ 475/347 |
| 5,976,020 A | * | 11/1999 | Lohaus et al. ................ 464/3 |
| 5,976,048 A | * | 11/1999 | Sudau et al. ................ 475/159 |
| 6,006,879 A | * | 12/1999 | Sudau ........................ 192/3.29 |
| 6,019,683 A | * | 2/2000 | Sudau ........................ 464/68 |
| 6,026,940 A | * | 2/2000 | Sudau ........................ 192/3.28 |
| 6,067,876 A | * | 5/2000 | Lohaus ....................... 74/574 |
| 6,089,121 A | * | 7/2000 | Lohaus ....................... 74/574 |
| 6,109,134 A | * | 8/2000 | Sudau ........................ 74/574 |
| 6,119,840 A | * | 9/2000 | Dettmar ..................... 192/70.17 |

FOREIGN PATENT DOCUMENTS

| | | | | |
|---|---|---|---|---|
| DE | 767 802 | | 8/1953 | |
| DE | 35 00 176 | | 9/1985 | ............. F16D/3/12 |
| DE | 37 22 144 | | 1/1989 | ............. F16F/15/12 |
| DE | 44 26 317 | | 2/1995 | ............. F16F/15/30 |
| DE | 197 00 851 | | 7/1997 | ............. F16F/15/22 |
| DE | 38 34 284 | | 12/1997 | ............. F16F/15/28 |
| DE | 197 21 926 | | 12/1997 | ............. F16D/13/60 |
| GB | 2318169 A | * | 4/1998 | ................ 74/574 |
| GB | 2325041 A | * | 11/1998 | ................ 74/574 |

* cited by examiner

*Primary Examiner*—Vinh T. Luong
(74) *Attorney, Agent, or Firm*—Cohen, Pontani, Lieberman & Pavane

(57) ABSTRACT

A vibration damping device for a drive system of a motor vehicle, includes a deflection mass arrangement arranged in a base body which is rotatable about an axis of rotation (A). The deflection mass arrangement includes at least one deflection mass and a deflection path associated with the at least one deflection mass and along which the deflection mass moves during rotation of the base body about the axis of rotation (A). The deflection path has a vertex area and deflection areas on both sides of the vertex area. The deflection areas have a decreasing distance from the axis of rotation (A) as they proceed from the vertex area toward their circumferential end areas. A positive rolling arrangement is arranged between the at least one deflection mass and the deflection path which generates a rolling movement of the at least one deflection mass during the movement of the at least one deflection mass along the associated deflection path and thereby prevents a sliding movement of the deflection mass.

22 Claims, 8 Drawing Sheets

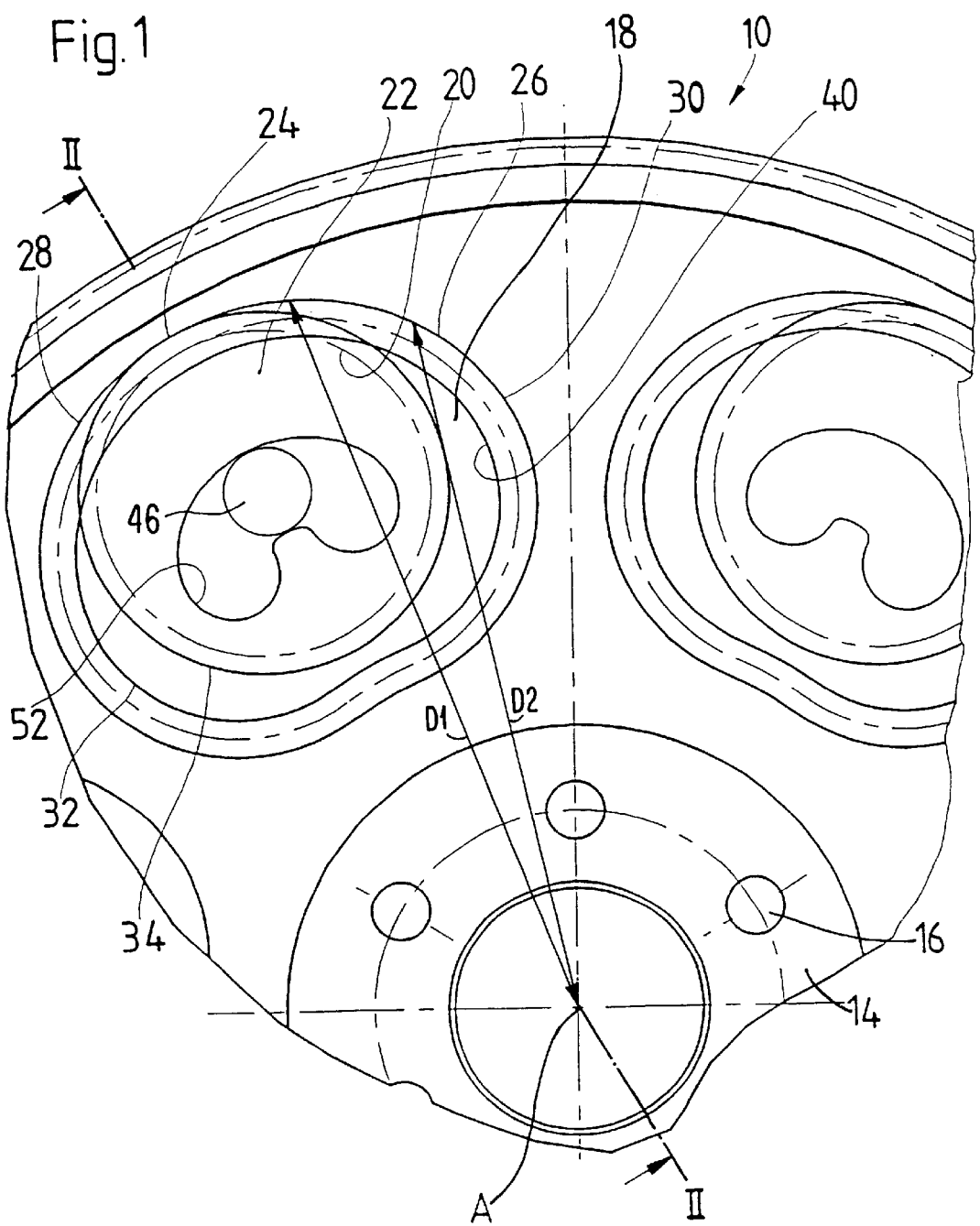

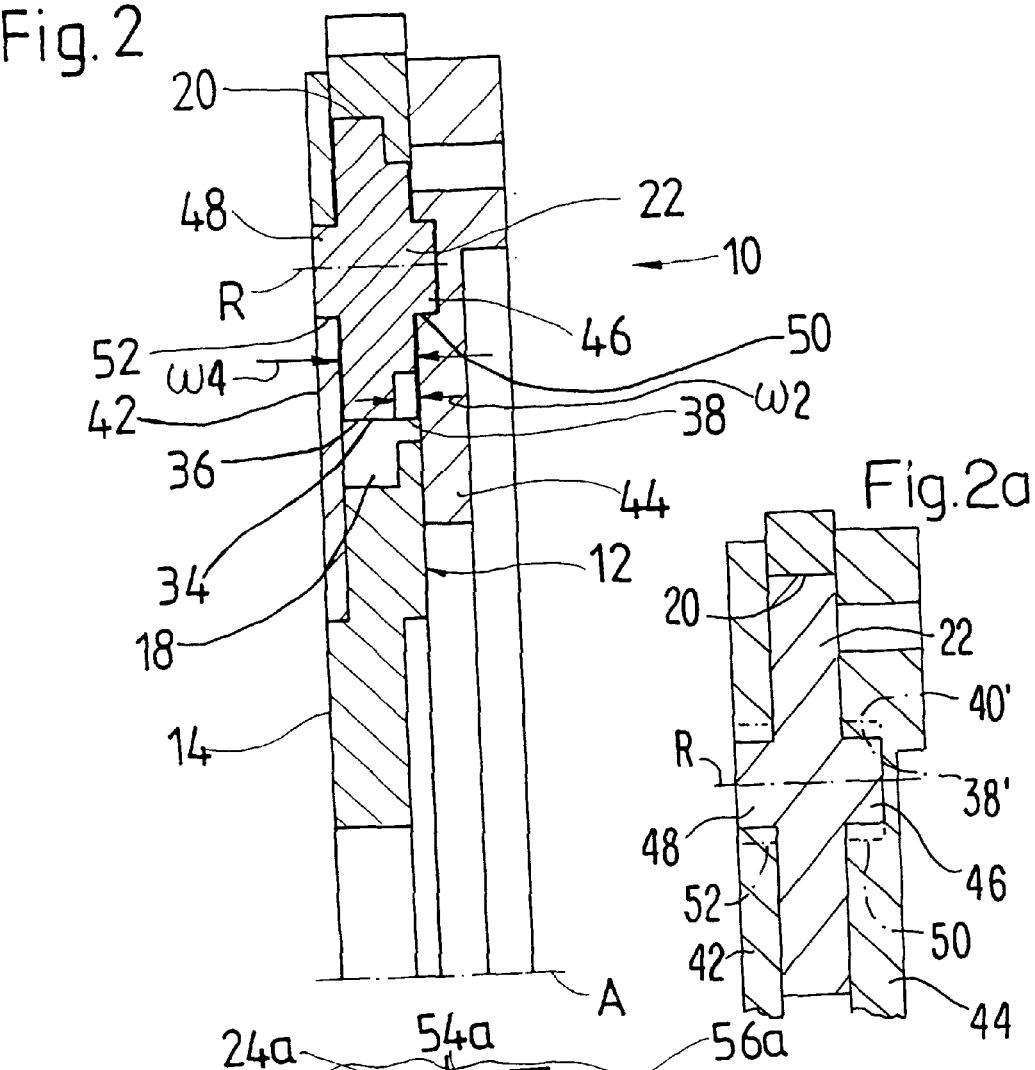
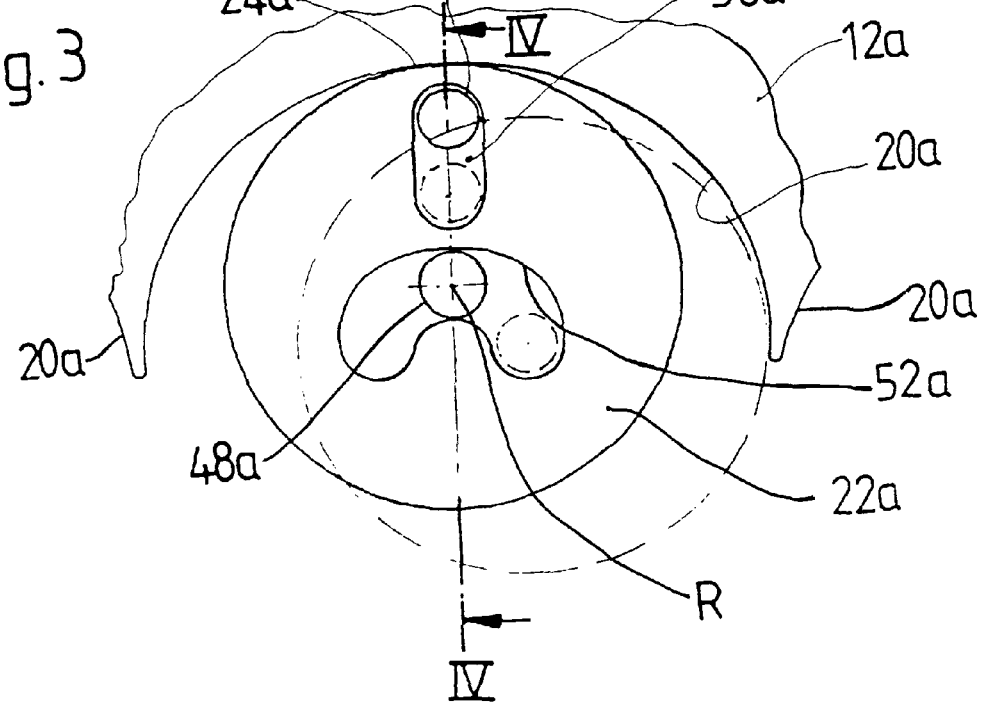

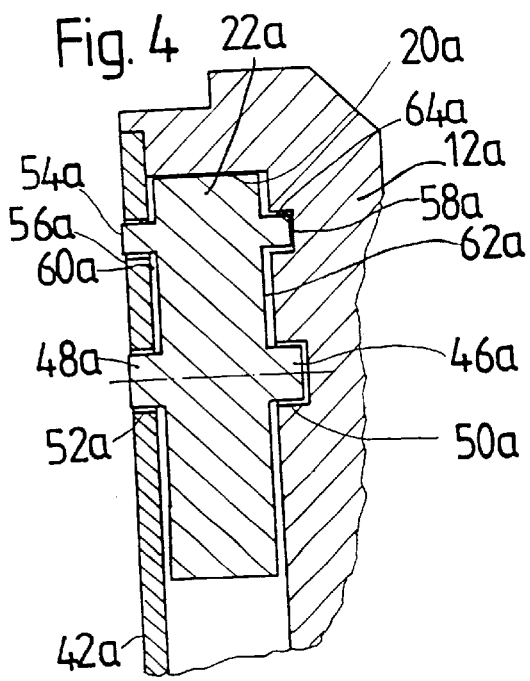
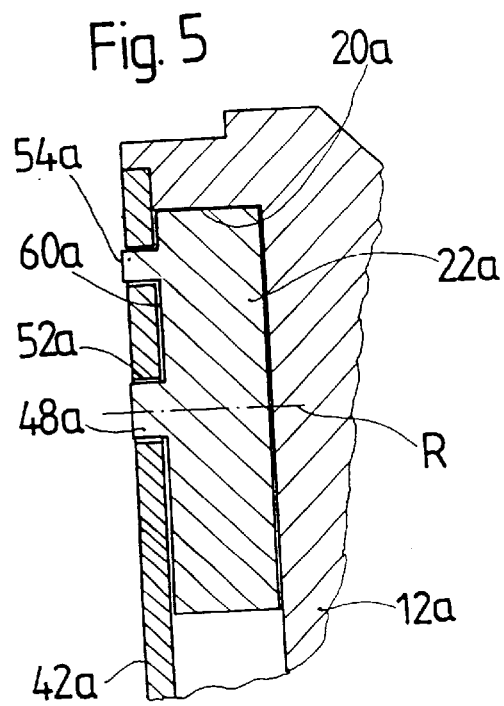
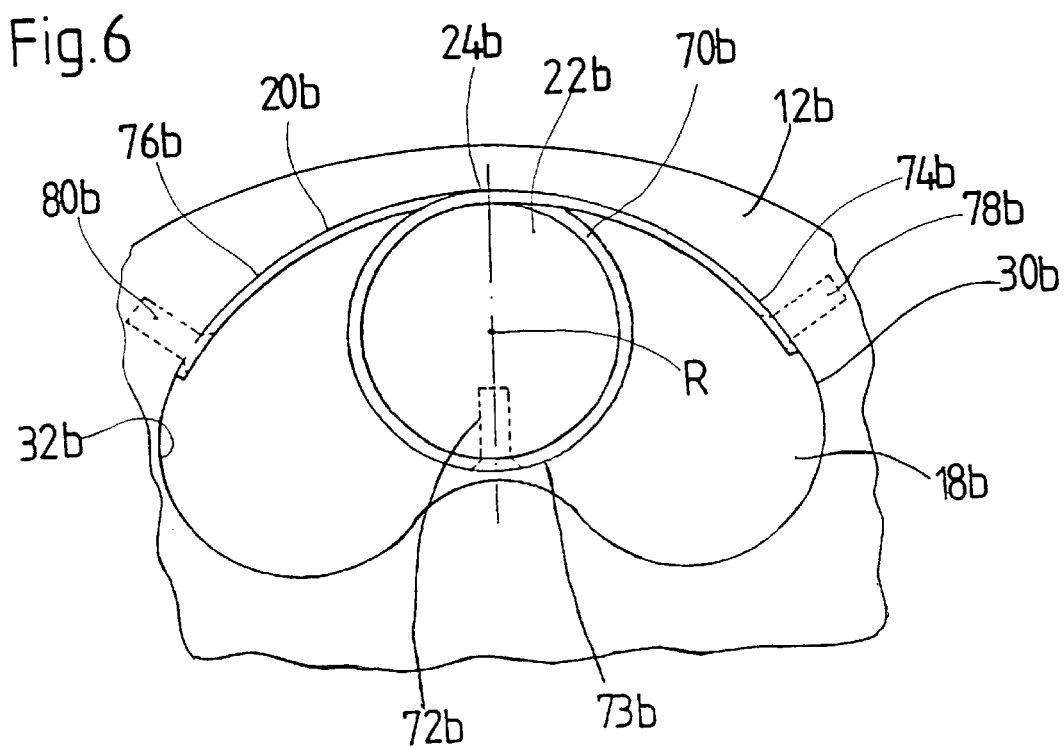

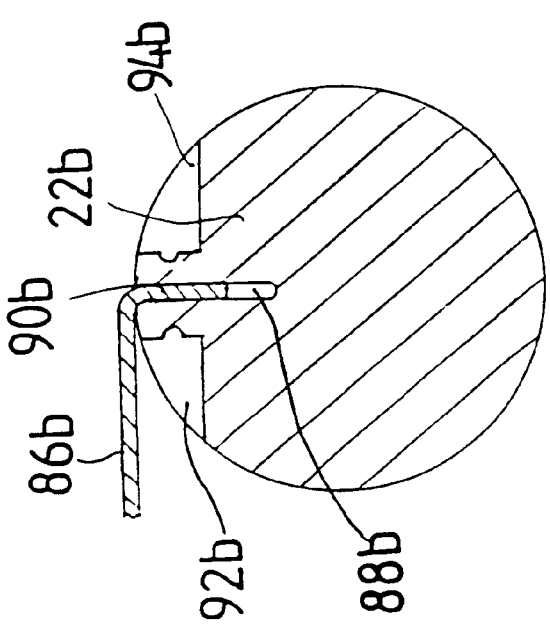
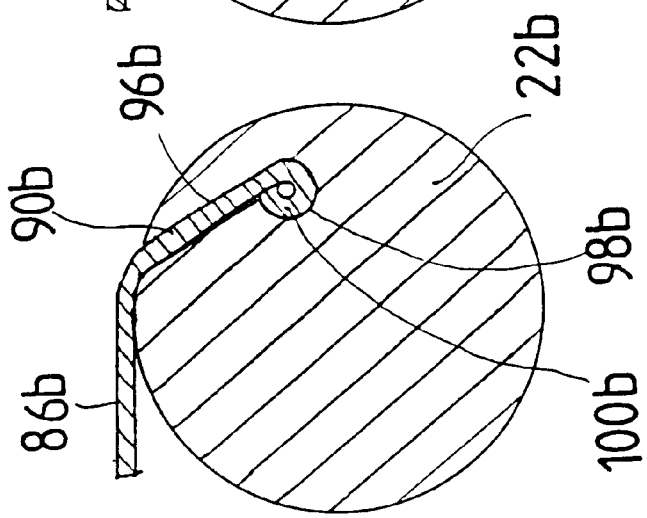
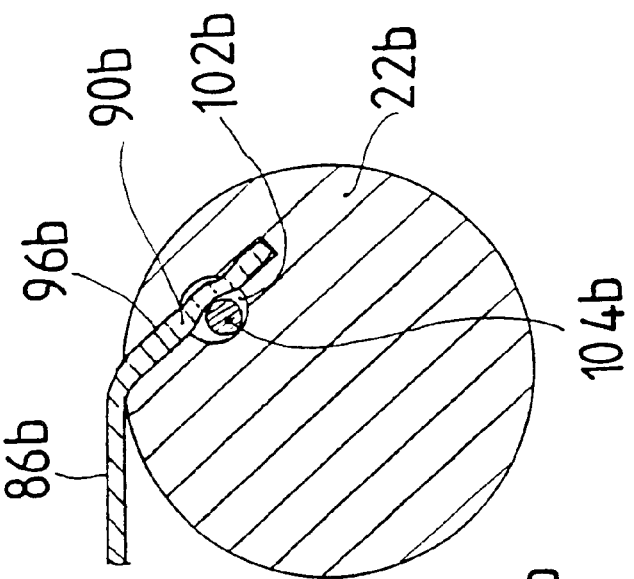

VIBRATION DAMPING DEVICE

BACKGROUND OF THE INVENTION

1. Field of the Invention

The present invention relates to a vibration damping device for a drive system of a motor vehicle comprising a base body rotatable about an axis of rotation and a deflection mass arrangement arranged in the base body and having at least one deflection mass and a deflection path which is associated with the at least one deflection mass and along which the deflection mass can move during rotation of the base body about the axis of rotation, wherein the deflection path has a vertex area and deflection areas on both circumferential sides of the vertex area and the deflection areas have a decreasing distance from the axis of rotation proceeding from the vertex area toward their circumferential end areas.

2. Description of the Related Art

A vibration damping device is known from DE 44 26 317 A1 having a plurality of deflection paths arranged at a base body and distributed about the axis of rotation of the base body. A plurality of deflection masses are respectively movably arranged for moving along these deflection paths. The deflection paths for the deflection masses are curved toward the axis of rotation. When torsional vibrations occur, the deflection masses are deflected from the vertex areas of the deflection paths and approach the axis of rotation. As they approach the axis of rotation, the deflection masses change centrifugal potential and thereby absorb energy. In this way, there is generated an oscillation of the individual deflection masses which opposes the exciting vibrations and which leads to the damping or elimination of defined excitation frequencies. Vibration damping devices of this kind are especially suitable for damping higher harmonic oscillations of vibrations which are generated by ignitions occurring periodically in an internal combustion engine.

The individual deflection masses roll during their movement along the deflection paths so that energy is not only transferred in the displacement of the deflection masses in centrifugal potential, but is also converted into the rotational energy of the individual deflection masses. Accordingly, to adapt the deflection mass and deflection path configuration to a determined excitation frequency to be damped, there must be a defined relationship between the deflection of the individual deflection masses, i.e., the displacement in centrifugal potential, and the energy changed into the rolling movement. However, when the deflection masses approach the end of the deflection path, the contact pressing forces which are generated by the centrifugal force and by which the individual deflection masses are pressed against the deflection paths decrease because of the increasing curvature of the paths. The decrease in the contact pressing forces changes the friction ratios in the area of contact of the deflection masses at the associated deflection paths, thereby increasing the risk, especially in the end area of the individual paths, that a transition from a rolling movement to a sliding movement will occur and place the natural frequency of the oscillators out of tune. The detuning of the natural frequency results in the loss of the adjustment to the frequency to be damped and the vibration damping device no longer fulfills its function in a satisfactory manner.

SUMMARY OF THE INVENTION

An object of the present invention is to provide a vibration damping device which prevents the risk of an undefined detuning of the natural frequency.

According to an embodiment of the present invention, this object is met by a vibration damping device, in particular for a drive system of a motor vehicle, comprising a base body which is rotatable about an axis of rotation and a deflection mass arrangement arranged in a base body and having at least one deflection mass and a deflection path which is associated with the at least one deflection mass and along which the deflection mass can move during rotation of the base body about the axis of rotation. The deflection path has a vertex area and deflection areas on both sides of the vertex area. The deflection areas have a decreasing distance from the axis of rotation of the base body proceeding from the vertex area toward circumferential end areas of the deflection areas.

The vibration damping device according to the invention further comprises a positive rolling arrangement via which the at least one deflection mass rolls during the movement of the at least one deflection mass along the associated deflection path.

Accordingly, appropriate steps are taken in the vibration damping device according to the invention to compel the rolling movement of the at least one deflection mass and thereby prevent the transition to a state of sliding motion. Throughout the length of the deflection path and especially in the area of the respective ends of the deflection paths and when sharp changes in rotational speed occur, the at least one deflection mass moves along the associated deflection path while carrying out a rolling movement so that a defined proportion of the excitation energy is changed into rotational energy in these movement states or path areas. The detuning of the natural frequency occurring in the prior art due to undefined movement behavior is therefore prevented.

The positive rolling arrangement may, for example, comprise a toothing arrangement acting between the at least one deflection mass and the base body or a component connected therewith.

Since the at least one deflection mass generally moves on the associated deflection path, it is suggested that the toothing arrangement comprises a toothing provided at an outer circumference of the at least one deflection mass and a counter-toothing provided at the deflection path.

In the above embodiment, the toothing may extend over a portion of the width of the outer circumferential surface of the at least one deflection mass. In this way, a functional separation is provided such that a smooth rolling surface is still provided while the rolling movement is nevertheless compelled in another surface region at the same time.

To prevent the occurrence of an unwanted tilting movement of the at least one deflection mass due to this functional separation, it is suggested that the width portion of the toothing comprises at most one half of the total width of the outer circumferential surface.

To achieve a round rolling movement in which the influence of the toothing is minimized, it is suggested that the toothing and the counter-toothing are constructed essentially only for the transmission of forces directed approximately along the deflection path. That, is, the individual teeth of the toothing act only to compel the rolling movement when, upon the occurrence of minimum sliding movement, a slight movement play between the teeth of the toothing and counter-toothing is overcome and the teeth accordingly strike against one another by their respective flanks in the direction of the deflection path. In particular, however, essentially no substantially orthogonal forces relative to the respective deflection path are transmitted between the toothing and the counter-toothing. This means that the toothing and counter-toothing do not absorb any centrifugal force components pressing the respective deflection masses radially outward.

Furthermore, the at least one deflection mass may have at least one guide pin which is movable along a guide path during the movement of the at least one deflection mass along the deflection path. To achieve the above-mentioned functional separation between compelling the rolling movement and receiving the centrifugal forces also in a construction of this kind, it is suggested that the toothing arrangement acts between the at least one guide pin and the associated guide path. In a construction of this kind, the at least one deflection mass may continue to be supported at the associated deflection path under the influence of the centrifugal forces, but the compelling of the rolling movement is effected in the area of the at least one guide pin and the associated guide path, i.e., remote from the centrifugal support.

Alternatively, an opposite arrangement may also be used in that the deflection mass is supported during movement at the guide path associated with the at least one guide pin and in that forces directed substantially only approximately along the deflection path may be transmitted between the toothing and the counter-toothing.

In this embodiment, the at least one deflection mass is supported at the guide path and the deflection path essentially receives no forces that are directed radially outward. In contrast, a rolling movement of the at least one deflection mass is compelled by the toothing arrangement provided in the area of the deflection path and outer circumference of the at least one deflection mass, wherein this toothing arrangement is now substantially kept free from centrifugal forces.

In an alternative embodiment, the positive rolling arrangement may comprise a guide projection/guide path arrangement by which a rolling movement of the at least one deflection mass is generated during deflection of the at least one deflection mass out of the vertex area of the associated deflection path. In this way, a transmission mechanism is introduced, wherein when the respective deflection mass attempts to move along the deflection path, this transmission mechanism compulsorily moves these deflection masses in a rolling movement.

For example, the guide projection/guide path arrangement may comprise at least one guide projection which is offset with respect to a rolling axis of the at least one deflection mass, i.e., is not centric relative to the at least one deflection mass, and a guide path associated with this guide projection. Further, a guide projection may be arranged at the at least one deflection mass so as to be concentric to a rolling axis thereof, and that the guide path associated with this guide projection is provided at the base body or at a component connected with the latter and essentially follows the course of the deflection path.

To achieve a movement of the at least one deflection mass with as little squeezing or jamming as possible, the guide projection/guide path arrangement comprises at least two guide projections and guide paths associated therewith and that the at least two guide projections are provided at the same axial sides or at different axial sides with respect to the rolling axis of the at least one deflection mass.

A further improved guiding action in the introduction of the positive rolling movement may be achieved when the guide projection/guide path arrangement comprises two groups of guide projections and guide paths associated with the latter and when one of the groups of guide projections with associated guide paths is provided at every axial end side of the at least one deflection mass with respect to the rolling axis of the same.

In another alternative embodiment form, the positive rolling arrangement comprises a rolling strip arrangement surrounding the at least one deflection mass and having end areas fixed in one of the end areas of the deflection path associated with the at least one deflection mass.

In this embodiment, the rolling strip arrangement may comprise a rolling strip which loops around the at least one deflection mass by at least one turn.

To prevent a tilting of the rolling strip arrangement that is compulsorily generated during the looping, the rolling strip arrangement may comprise at least two rolling strip portions which are fixed by one end to an end area of the deflection path and by the other end to the deflection mass and which surround the deflection mass in opposite directions. In this respect, the forces on the deflection mass originating from the bending forces at the wound-on strip are canceled and enable a deflection that is extensively free from forces.

In this connection, the at least two rolling strip portions are offset with respect to one another in the direction of a rolling axis of the at least one deflection mass.

To prevent unwanted tilting of the at least one deflection mass in a construction of the type mentioned above, the rolling strip arrangement may comprise at least three rolling strip portions, wherein rolling strip portions which directly follow one another surround the deflection mass in opposite circumferential directions.

Furthermore, the at least two rolling strip portions may be connected with one another by a connection strip portion to facilitate assembly.

To dimension the deflection angle area of a respective deflection mass as large as possible proceeding from the vertex area of the associated deflection path, the rolling strip arrangement may be looped multiple times around the associated deflection mass, so that a correspondingly extensive rolling movement may be generated. However, this arrangement means that the rolling strip arrangement and the rolling strip portions will overlap in some areas when they are wound completely around the associated deflection mass and, in this overlapping area, would generate a step opposing a circular rolling movement. To prevent this step in the overlapping area, a rolling surface region is provided at the at least one deflection mass, wherein this rolling surface region is associated with every rolling strip portion and, proceeding from the area in which the respective rolling strip portion is secured to the deflection mass, is at a distance helically from the rolling axis of the deflection mass, wherein a lead or pitch of the helically extending rolling surface region substantially corresponds to the material thickness of the respective rolling strip portion.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several vies:

FIG. 1 is a partial axial view of a first embodiment form of a vibration damping device according to the present invention;

FIG. 2 is a sectional view of the vibration damping device along a line II—II in FIG. 1;

FIG. 2a is a sectional view of another embodiment of the vibration damping device according to the present invention;

FIG. 3 is a partial axial view of an alternative embodiment of a vibration damping device according to the present invention;

FIG. 4 is a sectional view of a vibration damping device along a line IV—IV in FIG. 3;

FIG. 5 shows a view corresponding to FIG. 4 of an alternative embodiment of a vibration damping device;

FIG. 6 is a partial axial sectional view of another alternative embodiment of a vibration damping device according to the present invention;

FIGS. 10 to 12 show various embodiments for arranging a rolling strip portion at a deflection mass;

DETAILED DESCRIPTION OF THE PRESENTLY PREFERRED EMBODIMENTS

Figure 1A:
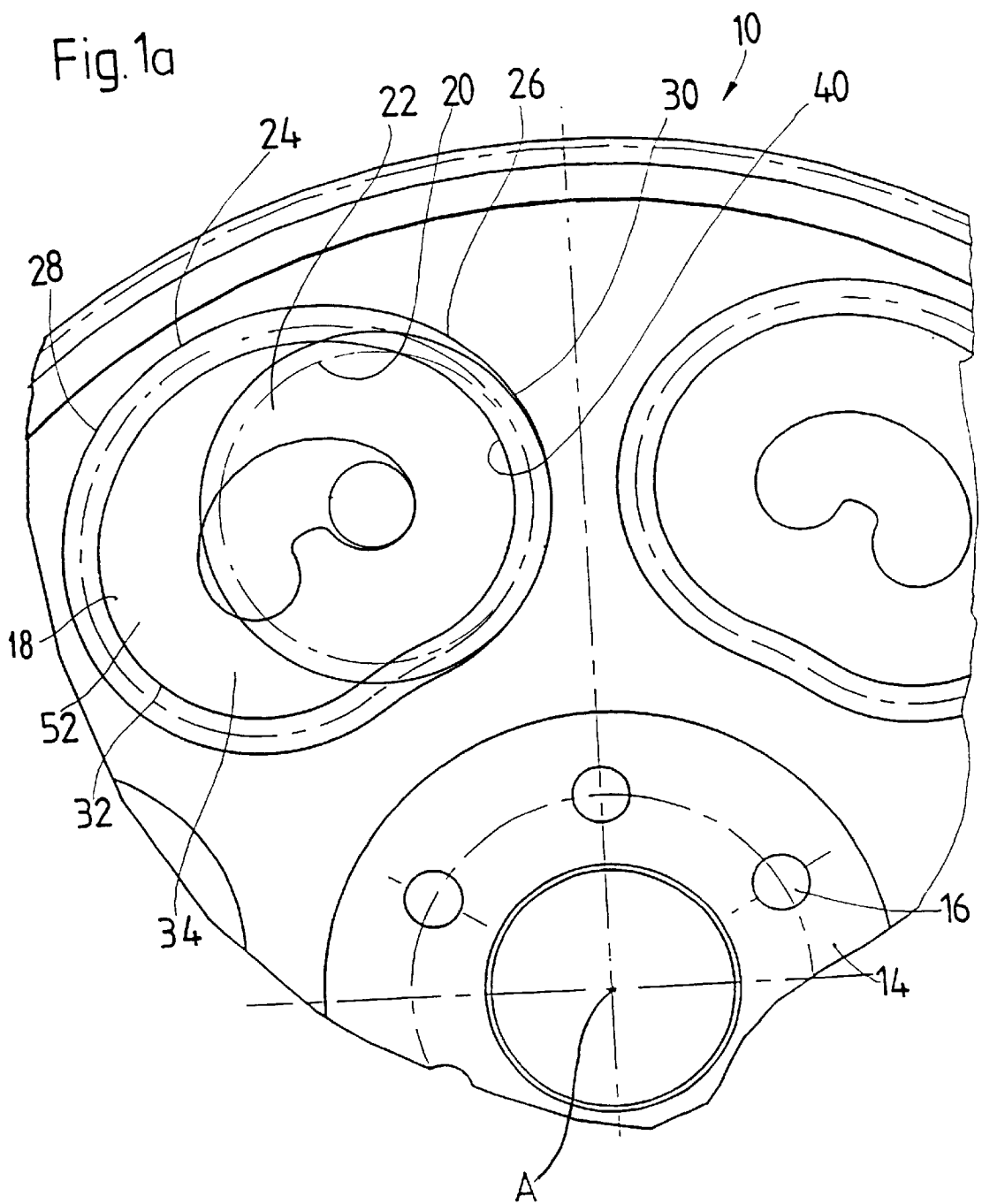
FIG. 1a is a partial axial view of the vibration damping device of FIG. 1 in a different operating position.

FIGS. 1 and 2 show a first embodiment form of a vibration damping device 10 constructed, for example, as a flywheel for a motor vehicle clutch. The vibration damping device 10 may alternatively be constructed as a flywheel mass of a multiple-mass flywheel or may be incorporated in any area as a separate flywheel arrangement in a rotating system. A base body 12 of the vibration damping device 10 extends around an axis of rotation A and is rotatable around this axis of rotation A. A radial inner side of the base body 12 has a shoulder area 14 with a plurality of screw openings 16 through which fastening pins may be guided, for example, for screwing the base body 12 onto a driveshaft or crankshaft of an internal combustion engine. A plurality of recesses 18 are distributed in the circumferential direction in the radial outer area of the base body 12. The recesses 18 are approximately kidney-shaped or peanut-shaped when viewed along the axial direction (see FIG. 1). A radial outer area of each recess 18 forms a deflection path 20 along which a deflection mass 22 that is received in the recess 18 can move. FIG. 1 shows that every deflection path 20 has a vertex area 24 which is the area having the greatest radial distance from the axis of rotation A. Proceeding from both sides of the vertex area 24, every deflection path 20 also has deflection areas 26, 28 which approach the axis of rotation A to an increasing extent proceeding from the vertex area 24. That is, the distance between the deflection areas 26, 28 decreases proceeding from the vertex area 24. For example, the distance D2 from a point P2 on the deflection area 26 to the axis of rotation A in FIG. 1 is less than the distance D1 from a point P1 on the deflection area 26 to the axis of rotation A, wherein the point P2 is further from the vertex area than the point P1.

During rotary operation, the effective centrifugal forces arrange each of the deflection masses 22 at the radial outer area, i.e., in the vertex area 24 of the deflection paths 20. When fluctuations in rotational speed occur, for example, as a result of the periodically occurring ignition thrusts of an internal combustion engine, vibrational excitation of the individual deflection masses 22 occurs so that the deflection masses 26 move into their deflection areas 26 and 28 periodically proceeding from the vertex area 24 (e.g., see FIG. 1a). The excitation of the deflection masses 22 which are positioned so as to be distributed in the circumferential direction builds up a counter-vibration that opposes the exciting vibration and accordingly damps or eliminates the exciting vibration. Vibration damping devices of this kind are especially suitable for damping higher harmonic orders of excitation frequencies of an internal combustion engine. To retain a constant adjustment to this frequency regardless of the intensity or amplitude of the exciting frequency, each of the deflection paths 20 may be constructed so that the centers of gravity of the deflection masses 22 move on epicycloidal paths. It has been shown that amplitude in an epicycloidal shape does not affect the natural frequency of the oscillators generated in this way, i.e., the natural frequency is not dependent on the amplitude. Accordingly, the adaptation or adjustment of a vibration damper having a epicycloidal path to a determined excitation frequency is retained even in the case of large excitation amplitudes.

During the deflection from the vertex area 24 and the movement of the deflection masses 22 along their deflection paths 20 caused this deflection, the present invention ensures that a rolling movement occurs in a defined manner and that no unwanted sliding states occur particularly in the area of the path ends 30, 32 (the normal forces acting between the respective deflection mass 22 and the associated deflection path 20 are minimal at the path ends because of the curvature of the deflection paths 20). FIGS. 1 and 2 show that the outer circumferential area 34 of deflection mass 22 is divided into two areas along the width W4, i.e., along an axial direction of a rolling axis R of the respective deflection mass 22. A first area is a rolling surface region 36 which rests over its full surface on the associated deflection path 20 and therefore supports the deflection mass 22 on this path 20. A second area comprises a toothing area 38 which occupies a distance W2 which is less than one half of the distance of the width W4 of the outer circumference in the direction of the rolling axis R. The toothing area 38 meshes with a counter-toothing 40 extending along the deflection path 20. When the deflection mass 22 is set in motion, a rolling movement of the deflection mass 22 is generated and a sliding movement is prevented in a compulsory manner because of the meshed engagement of the toothing area 38 with the counter-toothing area 40, so that a defined energy component is changed into the rotational energy of the deflection mass 22.

For the rolling movement to be as round as possible in the above embodiment, the individual deflection masses 22 are supported on the deflection path via the surface region 36 as was described above and the toothing area 38 and counter-toothing area 40 are adapted such that no forces normal to the respective deflection path 20 are transmitted through this toothing area 38 and counter-toothing area 40. Rather, the toothing area 38 and counter-toothing area 40 abut one another only in the direction of the respective deflection path 20 and accordingly cause a positive rolling movement of the deflection mass around axis R, the positive rolling movement being a rolling movement in wich there is no slipping of the deflection mass 22 on the deflection path 20. For this purpose, a minimum movement play may be arranged between the toothing 38 and the counter-toothing 40 in the direction normal to the respective deflection path 20 as well as along the respective deflection path 20.

As depicted in FIG. 2, cover plates 42, 44 adjoin the base body 12 in both axial directions. The cover plates 42, 44 form an axial closure of the recesses 18 and accordingly hold the deflection masses 22 in these recesses 18. It is possible for the cover plate 44 to be constructed as one piece with the base body 12. To prevent tilting of the deflection masses 22 under the influence of centrifugal forces due to the changing outer circumferential contour of the deflection masses 22 in the axial direction, the area 36 of the outer circumference is preferably wider than one half of the entire outer circumferential surface region 34, so that the center of gravity of the respective deflection masses 22 lies axially inside of the area 36. However, there could also be a configuration in which toothings are provided at both axial end regions and a surface region 36 serving for the rolling movement on the associated deflection path 20 is provided only in a central axial area. The opposite arrangement would also be possible, namely, the arrangement of a toothing in the central area and a rolling surface region on both sides of the latter in the axial direction.

To realize the above-mentioned functional separation of the rolling support on the one hand and the compelling of the rolling movement on the other hand, at least one guide pin or a guide projection 46, 48 may be provided at every deflection mass 22 as shown in FIGS. 1 and 2. Two guide pins 46, 48 extending in opposite axial directions are realized in the present embodiment form. These guide pins or guide projections 46, 48 are respectively inserted in guide paths 50, 52 arranged in the two cover plates 42, 44 and along which the respective guide pins 46, 48 move during the movement of the deflection mass 22. Instead of arranging the above-mentioned toothing 38 and counter-toothing 40 in the area of the outer circumference of the deflection masses 22 and deflection paths 20, the individual guide pins 46, 48 may be constructed in the manner of gearwheels, i.e., encircled by a toothing 38' which meshes with a corresponding counter-toothing 40' along the respective guide paths or recesses forming these guide paths 50, 52 in the cover plates 42, 44 as shown in FIG. 2a. The contact of the deflection masses 22 at their associated deflection paths 20 supports the deflection masses 22, and the positive rolling movement is generated by the meshing teeth in the area of the guide pins 46, 48 and guide paths 50, 52. To enable this movement, the guide paths 50, 52 must either release the respective guide pins 46, 48 at one side, i.e., they may not engage with the respective teeth at that location, or toothing portions may be provided at the guide paths either only at the radial outer side or only at the radial inner side. Furthermore, an opposite arrangement may be provided in which a toothing is arranged at the outer circumference 34 and a counter-toothing is arranged at the deflection path 20. Radial support, i.e., the support relative to centrifugal forces, is effected by the cooperation of the guide pins 46, 48 with the respective guide paths 50, 52. In this case, also, the toothing arrangement formed by the toothing 38' and counter-toothing 40' can be kept free from centrifugal forces and serve only to compel a rolling movement.

To provide a counter-toothing in the area of the deflection path 20 in a simplified manner, the deflection path itself may be arranged on an insert part formed from a steel strip or metal strip and inserted in a corresponding recess in the base body 12. A toothing of optional configuration, i.e., at any lateral position, may then be arranged in this separate strip material in a simple manner by shaping or deformation, wherein, further, a very wear-resistant deflection path can be ensured by selecting a suitably hard material.

A vibration damping device 10a according to another embodiment of the present invention in which a positive rolling movement of a deflection mass 22a is generated is shown in FIGS. 3 to 5. Components corresponding to the components described above are designated by the same reference numbers with an "a" appended thereto.

In this embodiment, a guide projection/guide path arrangement acts between a deflection mass 22a and a base body 12a (or a component which is connected therewith). FIG. 3, for example, shows a first guide projection 48a arranged concentric to the deflection body 22a relative to the rolling axis R. The first guide projection 48a is movable, for example, in an associated guide path 52a in a cover plate 42a. The contour or the course of the guide path 52a exactly corresponds to the course of a deflection path 20a, i.e., an epicycloidal shape, so that the first guide projection 48a lies in an associated portion of the guide path 52a for every deflection position when the deflection mass 22a is supported at the deflection path 20a. Furthermore, a second guide projection 54a is arranged at the deflection mass 22a that is situated eccentrically with respect to the rolling axis R, i.e., at an offset with respect to the first guide projection 48a in a plane orthogonal to the rolling axis R. In the embodiment of FIG. 3, the second guide projection 54a lies approximately radially above or outside of the first guide projection 48a when the deflection mass 22a is positioned in a vertex area 24a. A guide path 56a which is constructed again in the cover plate 42a, for example, is associated with the second guide projection 54a and extends essentially radially in the present embodiment form.

If, as a result of a rotational irregularity, the deflection mass 22a is deflected along deflection path 20a proceeding from the neutral position shown in FIG. 3, for example, toward the right as is shown, the first guide projection 48a moves along the associated guide path 52a. Since the second guide projection 54a engages in the associated guide path 56a, the deflection mass 22a is compulsorily prevented from sliding and a movement is only possible when the second guide projection 54a is displaced radially inward along the associated guide path 56a as is indicated by the dashed line. The two guide paths 56a, 52a accordingly provide a positive guidance for the two guide projections 54a, 48a, wherein a rolling movement of the deflection mass 22a is compelled at the same time due to the compelled guiding movement. In this regard, the arrangement is preferably carried out in such a way that there is a slight movement play between the first and second guide projections 48a, 54a and the respective guide paths 52a, 56a so that a positive guidance is not compelled as long as the deflection mass 22a rolls by itself. It is only when there is a transition into a sliding movement that the second guide projection 54a abuts against guide path 56a and accordingly causes the positive rolling movement.

The following general remarks concern the construction of the guide paths, especially the guide path 56a associated with the second guide projection 54a. This guide path must have a course that allows the deflection mass 22a to effect a rolling movement so that the guide projection follows a trajectory without sliding the guide projection 56a which is guided in this guide path. The shape of the guide path will generally depend on the configuration of the deflection path. The flatter the deflection path, the more the guide projection 54*a*, e.g., in the view according to FIG. 3, will first move along the path when a rolling movement is carried out and will move only slightly radially inward. If the path curves more sharply, there may even occur a state in which the guide projection 54*a* would move in the opposite direction during the rolling of the deflection mass toward the right with reference to FIG. 3.

It is further noted that in the embodiment form shown in FIG. 3, the guide projection located centric to the rolling axis essentially has the object of lessening the knocking or any kind of rattling noise occurring when the end region of the respective deflection paths is reached. This is achieved because in this case two guide path and guide projection arrangements contribute to guidance and accordingly to movement damping. Accordingly, the guide projection which is shown at the top in FIG. 3 and which is located eccentrically with respect to the rolling axis is sufficient by itself to compel the rolling movement. As is shown in FIGS. 4 and 5, the guide projection may be provided at both axial sides or only at one side, or an eccentric guide projection could be provided at one axial side and a guide projection concentric to the rolling axis could be provided at the other axial side.

FIGS. 4 and 5 show two different embodiments in the area of the guide projections. FIG. 5 shows a constructional type in which the deflection mass 22*a* has first and second guide projections 48*a*, 54*a* only at an axial end side with respect to the rolling axis R, namely, at an axial end side 60*a*. Associated guide paths 52*a*, 56*a* are consequently also only formed in the cover plate 42*a*. In FIG. 4, a pair of guide projections 48*a*, 54*a* and 46*a*, 58*a* are provided at both axial end faces 60*a*, 62*a* of the deflection mass 22*a*. A corresponding pair of guide paths 52*a*, 56*a* or 50*a*, 64*a* is associated with the pair of guide projections. This embodiment form shown in FIG. 4 has the advantage that the transmission of force is carried out symmetrically in the direction of the rolling axis R when the rolling movement is compelled and a tilting of the respective deflection masses 22*a* can accordingly be prevented. It is noted that a construction of this kind can be provided irrespective of the configuration of the guide paths.

Another constructional type of vibration damping device according to the invention with compelled rolling movement is described in the following with reference to FIGS. 6 through 17. Components corresponding to the components described above with respect to construction and function are designated by the same reference numbers with a suffix "b" appended thereto. FIG. 6 shows one recess 18*b* of a plurality of recesses formed successively in a circumferential direction in a base body 12*b* of a vibration damping device 10*b*. Each of the recesses 18*b* forms a deflection path 20*b* with a preferably epicycloidal shape with a vertex area 24*b* having a greatest distance from an axis of rotation of the base body 12*b* as described above. A deflection mass 22*b* is movable along each of these deflection paths 20*b* and, as was the case in the embodiment forms described above, preferably has the shape of a circular cylinder or an approximately circular-cylindrical body.

Figure 7:
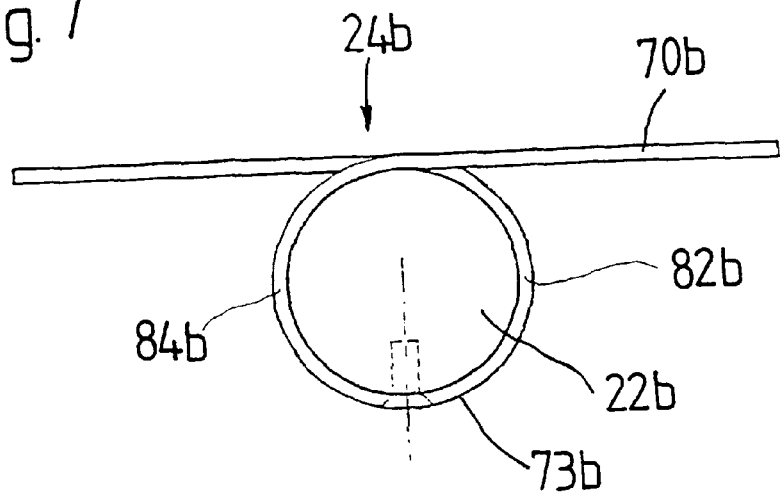
FIGS. 7 to 9 show various stages of operation of the embodiment form shown in FIG. 6.
Figure 8:
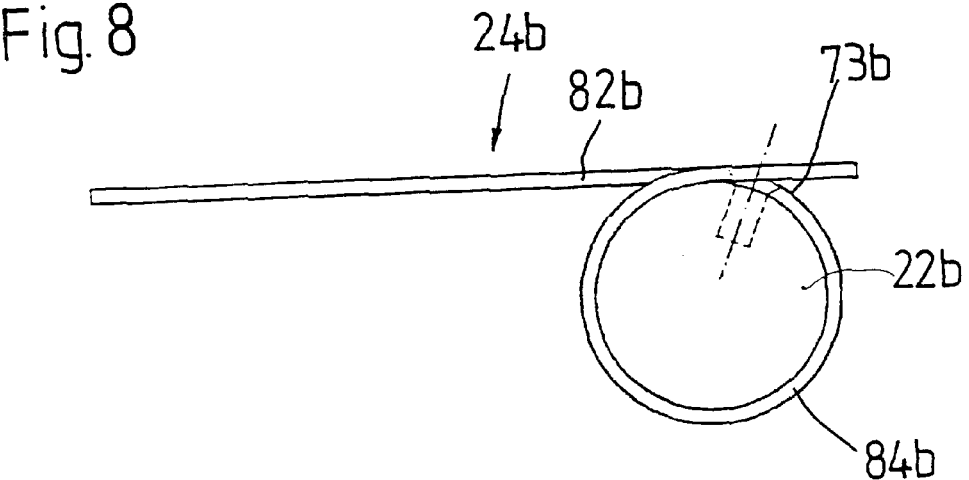
Figure 9:
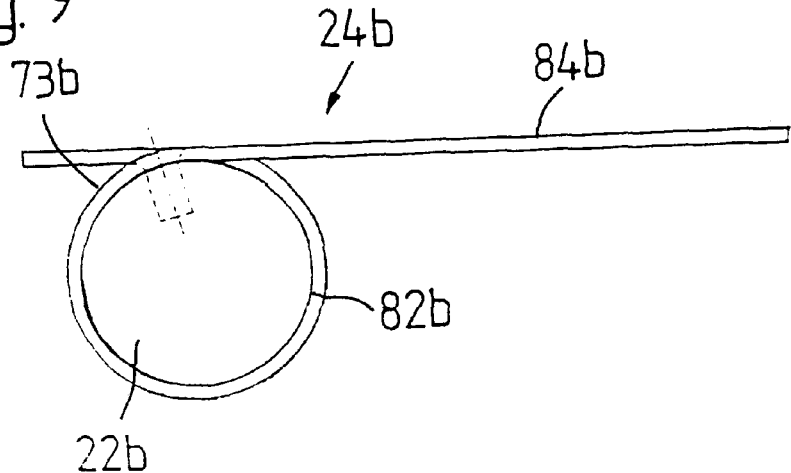

A rolling strip 70*b* loops around the deflection mass 22*b*. A middle area of the rolling strip 70*b* is secured via a fastening device such, for example, as a fastening screw 72*b* to the deflection mass 22*b*. The fastening screw 72*b* is fastened in an area 73*b* which is positioned exactly opposite to a vertex area 24*b* when the deflection mass 22*b* is positioned in the vertex area 24*b*. Proceeding from the area of the fastening screw 72*b*, the rolling strip 70*b* has one strip portion 82*b* that executes a half-turn with an end 74*b* that extends to an end area 30*b* of the deflection path 20*b* and another strip portion 84*b* that executes a half turn with another end 76*b* that extends to another end area 32*b* of the deflection path 20*b*. The rolling strip 70*b* is secured at the ends areas 30*b*, 32*b* by respective fastening screws or bolts 78*b* or 80*b*. If a vibrational excitation of the deflection mass 22*b* occurs due to rotational irregularities and causes a deflection of the deflection mass 22*b* from the region of the vertex area 24*b*, the deflection is limited by a length of the strip portion 82*b* or 84*b* of the rolling strip 70*b* proceeding from the fastening area 73*b* that may be unwound from the deflection mass 22*b*. The other winding portion or strip portion 82*b* or 84*b* is wound on. The winding an unwinding of the strip portions 82*b*, 84*b* of the rolling strip 70*b* is shown in FIGS. 7 to 9 in which a straight-line deflection path shape is shown for the sake of simplicity. FIG. 7 shows the neutral positioning in which the deflection mass 22*b* is positioned in the vertex area 24*b*. In FIG. 8, a deflection takes place toward the right and the strip portion 82*b* is unwound from the deflection mass 22*b* while the strip portion 84*b* is wound onto the deflection mass 22*b*. FIG. 9 shows that opposite movement in which the strip portion 82*b* is wound on and the strip portion 84*b* is wound off.

Since a determined pitch of the rolling strip 70*b* corresponding to the width of the rolling strip 70*b* is required by the looping around the deflection mass 22*b*, a slight inclination of the deflection mass 22*b* relative to the deflection path 20*b* occurs in a construction of this type. To minimize this effect, the width of the rolling strip 70*b* is made as small as possible. A wire material may advantageously be used as rolling strip 70*b* and wound around the deflection mass repeatedly, so that a relatively broad support contact is produced in the entire winding area and a tilting of the deflection mass 22*b* is prevented. However, a support in the lateral direction may be effected by the cover plates 42, 44 and base body 12 as described shown above.

To prevent the inclined position, a plurality of rolling strip portions may be used instead of one continuous rolling strip, wherein each of these rolling strip portions has an end that is fastened to the deflection mass 22*b* and another end that is fastened to the deflection path 20*b* as shown above. FIGS. 10 to 12 show various connections for securing a rolling strip portion 86*b* of this kind to the deflection mass 22*b*. Accordingly, in FIG. 10 the deflection mass 22*b* has a radial notch 88*b* in which an end portion 90*b* of the rolling strip portion 86*b* is inserted. Cutouts 92*b*, 94*b* are provided following the notch 88*b* in both circumferential directions, wherein a tool may be guided into these cutouts 92*b*, 94*b* after inserting the end 90*b* in the notch 88*b*. The tool squeezes together the material on either side of the notch 88*b* and accordingly fixes the end 90*b* in the notch 88*b*.

In FIG. 11, a notch 96*b* extends along a secant relative to the outer circumference of the deflection mass 22*b* and terminates in an enlarged end area 98*b* provided in the deflection mass 22*b*. The notch 96*b* with the enlarged end area 98*b* extend in the axial direction completely through the deflection mass 22*b*. The rolling strip portion 86*b* is introduced into the notch 96*b* and the end area 98*b* laterally by its end 90*b*. A fold or roll 100*b* is formed at the outermost end of the rolling strip portion 86*b* that fills the enlarged end area 98*b*, thereby fixing the rolling strip portion 86*b* in the deflection mass 22*b*.

According to FIG. 12, the notch 96*b* which extends along a secant as in FIG. 11 intersects an expanded space 102*b* through which the end 90*b* of the rolling strip portion 86*b* is guided. In this space 102*b*, a fastening device 104*b* such, for example as a ball or a rod may be squeezed in so that the fastening can also be achieved in this manner. The notch 96b and the space 102b also extend in the axial direction preferably completely through the deflection mass 22b.

The deflection masses 22b shown in FIGS. 10 to 12 may be obtained in a simple manner by cutting up a bar material with the cross-sectional configuration shown in the drawing or as stamped parts.

When a plurality of rolling strip portions 86b are provided, the plural rolling strip portions 86b must be arranged successively in the direction of the rolling axis R and the deflection mass 22b may comprise several of the individual bodies shown in FIGS. 10 to 13, for example, positioned successively in the direction of the rolling axis R and connected with one another by, for example, a rivet. Each of the individual rolling strip portions 86b may then be secured to a separate body. Instead of using separate bodies, separate notches or fastening means may also be provided for each rolling strip portion 86b in an integral body.

To prevent tilting of the deflection masses 22b, at least three rolling strip portions 86b are used, wherein rolling strip portions 86b following one another in the direction of the rolling axis R surround the deflection mass 22b in the opposite direction and wind on or wind off during the rolling movements.

Figure 13:
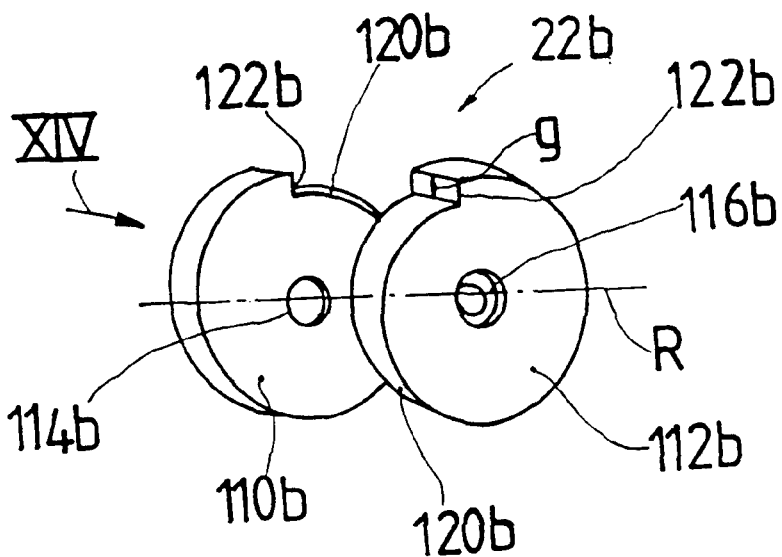
FIG. 13 is a perspective exploded view of an alternative embodiment of deflection mass having two body parts.
Figure 14:
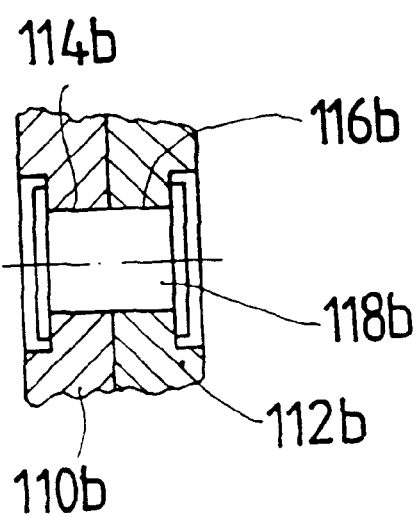
FIG. 14 is a sectional view of the deflection mass shown in FIG. 13 showing a connection of the two body parts in the central area of the same.
Figure 15:
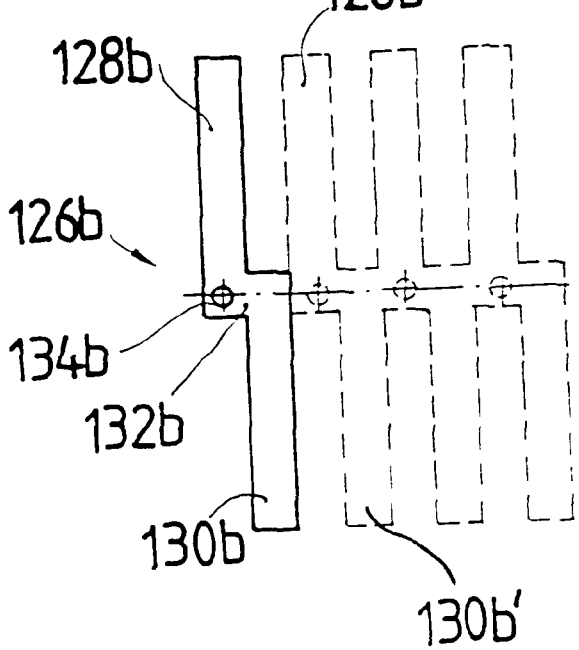
FIG. 15 is a top view of a rolling strip arrangement which can be used in connection with the deflection mass shown in FIG. 13.
Figure 16:
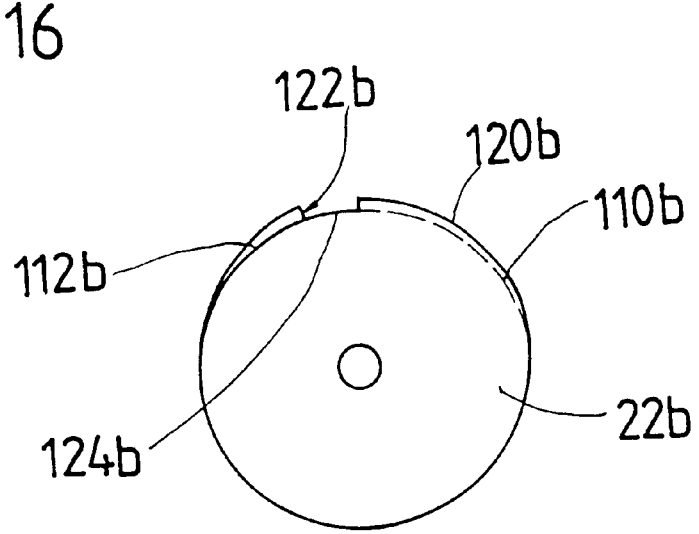
FIG. 16 is a side view of the deflection mass shown in FIG. 13.
Figure 17:
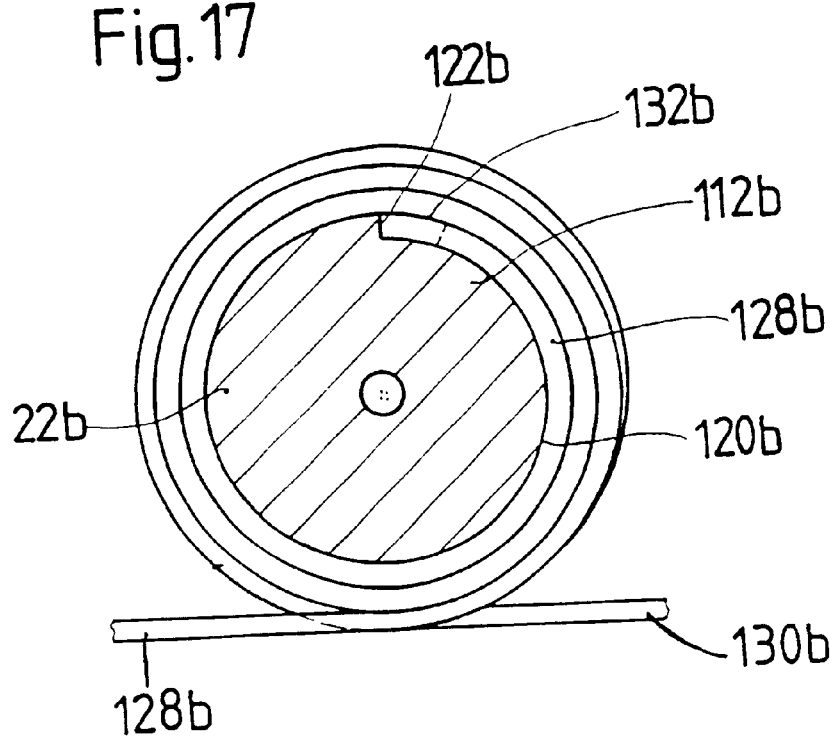
FIG. 17 is a side view of the deflection mass shown in FIG. 16 with a rolling strip arrangement wound around it.

When the rolling strip 70b or above-mentioned rolling strip portions 86b are looped around the deflection masses 22b only once as shown particularly in FIGS. 6 to 9, the deflection angle from the vertex area 24b is also limited to an area of 180° at each side, i.e., the length of the rolling strip 70b or 86b is limited to the portion wound to the fastening device 72b. If a greater deflection angle is required, multiple looping is required as was mentioned above, for example, referring to the use of a wire material as a rolling strip. However, if a strip-shaped, i.e., flat, rolling strip 70b or rolling strip portion 86b is to be looped around the deflection mass more than once, the rolling strip 70b or rolling strip portion 86b must be wound such that it overlaps after a turn. The transition into this overlapping area would lead to a step having a height equal to the thickness of the strip 70b or 86b. As a result, a shock would occur every time this step is rolled over when a rolling movement is carried out. This transition into the overlapping area may be prevented by providing a construction such as that shown in FIGS. 13 to 17. FIG. 13 shows that the deflection mass 22b is formed by two body parts 110b, 112b with respective central openings 114b, 116b. FIG. 14 shows that a rivet or connection bolt 118b may be guided through these openings 114b, 116b to connect the two bodies 110b, 112b with one another. The two bodies 110b, 112b are identically constructed and connected with one another such that one of the two bodies is turned by 180° with respect to the other around an axis extending orthogonal to the rolling axis R. Furthermore, the bodies 110b, 112b do not have circular outer contour. Rather, the bodies 110b, 112b each have a rolling surface 120b which surrounds the rolling axis R helically. A pitch g of the rolling surface manifests itself in the form of a shoulder 122b (see FIG. 16) approximately corresponding to the thickness of the strip material of the rolling strip 70b or rolling strip portion 86b. The helical shape of the outer contour of the deflection mass 22b is accounted for in the arrangement of the deflection path 20, 20a (see FIGS. 1 and 3). FIG. 16 shows that the two bodies 110b, 112b are connected with one another so that a circumferential gap 124b is formed between the two shoulders 122b. FIG. 15 shows a rolling strip unit 126b (in solid lines) to be used in connection with a deflection mass 22b which is composed of a plurality of bodies 110b, 112b. The rolling strip unit 126b comprises two strip portions 128b, 130b each having a width w. The two strip portions 128b, 130b are offset with respect to one another by the width w and are connected with one another by a connection area 132b. An opening 134b is arranged in the connection area 132b and receives a fastening element to secure the rolling strip unit 126b to the deflection mass 22b. The positioning of the rolling strip unit 126b is effected such that the connection portion 132b is fitted into the area of the gap 124b and in each of the strip portions 128b, 130b extends on one of the two bodies 110b, 112b along the associated rolling surface 120b. A comparison of FIG. 15 to FIG. 13 reveals that the strip portion 128b is guided on the outer circumferential surface 120b of the body 110b, while strip portion 130b is guided on the outer circumferential surface or rolling surface 120b of the body 112b. When the strip portions 128b, 130b are wound once completely around the associated bodies 110b, 112b, they again arrive in the area of the shoulder 122b at a distance from the rolling axis R at that location which is greater than the initial distance by an amount corresponding to the thickness of the material. When these strip portions 128b, 130b are further wound about the associated bodies 110b past the shoulder 122b, no step up over the previous layer occurs during the overlapping because the step is already compensated by the shoulder 122b. After multiple windings, the configuration shown in FIG. 17 results in which each of the strip portions 128b, 130b is wound multiple times about the respective body 110 and 112b and is accordingly wound multiple times around the deflection mass 22b. Using this configuration, an appreciably larger deflection angle may be generated when a rolling movement occurs which corresponds essentially to the quantity of windings of every strip portion about the associated body 110b, 112b.

To achieve a construction which is symmetric in the direction of the rolling axis R in an embodiment form of this kind and to provide an improved support relative to lateral tipping, a rolling strip unit 126b' may have more than two strip portions as is shown in FIG. 15. For example, three strip portions may be provided, namely, strip portions 128b and 128b', which are positioned next to one another, and a strip portion 130b extending in the other direction. However, it is also possible to provide additional strip portions 130b' on this side. A separate body 110b or 112b is then associated with each strip portion to be provided. Fore example, in the case of three strip portions 128b, 128b', and 130, an additional body 110b must be positioned in front of body 112b in the view shown in FIG. 13. Furthermore, the individual strip portions may alternatively be secured to the respective bodies 110, 112 as separate elements as was described above with reference to FIGS. 10–12.

It is noted that a strip-shaped rolling strip comprising spring steel is preferably used because a wear-resistant running path for the respective deflection mass is formed at the same time in this way.

The preceding description was concerned with different embodiment forms of a vibration damping device (also known as a speed-adaptive damper) that ensures in a compulsory manner that when the respective oscillating masses are deflected from their rest positions, they are set in a rolling motion to achieve a defined vibration behavior. The transition into a sliding state is prevented so that a detuning of the oscillators is prevented even at large amplitudes at which the contact pressure of the individual deflection masses against the associated deflection paths gradually decreases.

The invention is not limited by the embodiments described above which are presented as examples only but can be modified in various ways within the scope of protection defined by the appended patent claims.

We claim:

1. A vibration damping device for a drive system of a motor vehicle, comprising:

a base body rotatable about an axis of rotation; and a deflection mass arrangement arranged in said base body and having a deflection mass and a deflection path along which said deflection mass is freely movable during rotation of said base body about said axis of rotation, wherein said deflection path has a vertex area and deflection areas on opposing sides of the vertex area, the deflection areas extending from the vertex area to respective end areas and having a decreasing distance to said axis of rotation proceeding from the vertex area to said end areas, and wherein said deflection mass arrangement further comprises a positive rolling arrangement for generating a positive rolling movement of said deflection mass during movement of said deflection mass along said deflection path.

2. The vibration damping device of claim 1, wherein said positive rolling arrangement comprises a toothing arrangement arranged for acting between said deflection mass and said base body.

3. The vibration damping device of claim 2, wherein said toothing arrangement comprises a toothing arranged at an outer circumference of said deflection mass and a counter-toothing arranged at said deflection path.

4. A vibration damping device for a drive system of a motor vehicle, comprising:

a base body rotatable about an axis of rotation; and a deflection mass arrangement arranged in said base body and having a deflection mass and a deflection path along which said deflection mass is movable during rotation of said base body about said axis of rotation, wherein said deflection path has a vertex area and deflection areas on opposing sides of the vertex area, the deflection areas extending from the vertex area to respective end areas and having a decreasing distance to said axis of rotation proceeding from the vertex area to said end areas, and wherein said deflection mass arrangement further comprises a positive rolling arrangement for generating a positive rolling movement of said deflection mass during movement of said deflection mass along said deflection path, said positive rolling arrangement comprising a toothing arrangement arranged for acting between said deflection mass and said base body, wherein said toothing extends only over a portion of a width of said outer circumferential surface of said deflection mass.

5. The vibration damping device of claim 4, wherein said portion of a width comprises a distance not greater than one half of the total width of the outer circumferential surface.

6. The vibration damping device of claim 4, wherein said toothing and said counter-toothing are connected for transmitting only forces directed substantially along said deflection path.

7. A vibration damping device for a drive system of a motor vehicle, comprising:

a base body rotatable about an axis of rotation; and a deflection mass arrangement arranged in said base body and having a deflection mass and a deflection path along which said deflection mass is movable during rotation of said base body about said axis of rotation, wherein said deflection path has a vertex area and deflection areas on opposing sides of the vertex area, the deflection areas extending from the vertex area to respective end areas and having a decreasing distance to said axis of rotation proceeding from the vertex area to said end areas, and wherein said deflection mass arrangement further comprises a positive rolling arrangement for generating a positive rolling movement of said deflection mass during movement of said deflection mass along said deflection path, said positive rolling arrangement comprising a toothing arrangement arranged for acting between said deflection mass and said base body, and wherein said deflection mass comprises at least one guide pin and said deflection mass arrangement further comprises at least one guide path in which said at least one guide pin is movable during movement of said deflection mass along said deflection path.

8. The vibration damping device of claim 7, wherein said toothing arrangement acts between said at least one guide pin and said at least one guide path.

9. The vibration damping device of claim 7, wherein said toothing arrangement comprises a toothing arranged at an outer circumference of said deflection mass and a counter-toothing arranged at said deflection path, said deflection mass is supported during movement at said at least one guide path associated with said at least one guide pin, and only forces directed along said deflection path are transmitted between said toothing and said counter-toothing.

10. The vibration damping device of claim 1, wherein said positive rolling arrangement comprises a guide projection arranged on said deflection mass and a guide path arrangement in which said guide projection is received, said guide projection and said guide path arrangement being arranged for generating a positive rolling movement of said deflection mass during deflection of said deflection mass out of said vertex area of said deflection path.

11. The vibration damping device of claim 10, wherein said guide projection/guide path arrangement comprises at least one offset guide projection offset with respect to a rolling axis of said deflection mass and a guide path associated with said at least one offset guide projection.

12. The vibration damping device of claim 11, wherein said guide projection/guide path arrangement further comprises a concentric guide projection arranged at said deflection mass concentric to said rolling axis of said deflection mass and a guide path associated with said concentric guide projection provided at said base body substantially following a course of said deflection path.

13. The vibration damping device of claim 10, wherein said guide projection/guide path arrangement comprises at least two guide projections arranged on the same axial side of said deflection mass and at least two guide paths for respectively receiving said at least two guide projections.

14. The vibration damping device of claim 10, wherein said guide projection/guide path arrangement comprises at least two guide projection on opposing axial sides of said deflection mass and at least two guide paths for respectively receiving said at least two guide projections.

15. The vibration damping device of claim 10, wherein said guide projection/guide path arrangement comprises two groups of guide projections and guide paths for respectively receiving said two groups of guide projections, and wherein one of said two groups of guide projections is provided at each axial end side of said deflection mass relative to said rolling axis.

16. The vibration damping device of claim 1, wherein said positive rolling arrangement comprises a rolling strip arrangement surrounding said deflection mass and having ends respectively fixed at said end areas of said deflection path.

17. The vibration damping device of claim 16, wherein said rolling strip arrangement comprises a rolling strip looped around said at least one deflection mass by at least one turn.

18. The vibration damping device of claim 16, wherein said rolling strip arrangement comprises at least two rolling strip portions having one end fixed to one of said end areas of said deflection path and another end fixed to said deflection mass, wherein said at least two rolling strip portions surround said deflection mass in opposing directions.

19. The vibration damping device of claim 18, wherein said at least two rolling strip portions are offset with respect to one another in the direction of a rolling axis of said deflection mass.

20. The vibration damping device of claim 19, wherein said rolling strip arrangement comprises at least three rolling strip portions, and each adjacent pair of said at least three rolling strip portions surround said deflection mass in opposing directions.

21. The vibration damping device of 19, further comprising a connection strip portion connecting said at least two rolling strip portions.

22. The vibration damping device of claim 18, wherein said deflection mass comprises rolling surface regions respectively associated with each of said at least two rolling strip portions, said rolling surface regions proceeding helically from an area in which the respective one of said at least two rolling strip portions is secured to said deflection mass, wherein a pitch (g) of the helically extending rolling surface region substantially corresponds to a material thickness of said respective one of said at least two rolling strip portions.

* * * * *